United States Patent [19]

Lee

[11] 4,342,406
[45] Aug. 3, 1982

[54] DISPENSER FLOW PROPORTIONING DEVICE

[75] Inventor: Gerry A. Lee, Olin, Iowa

[73] Assignee: Beatrice Foods Co., Chicago, Ill.

[21] Appl. No.: 187,751

[22] Filed: Sep. 16, 1980

[51] Int. Cl.³ .............................................. G01F 11/28
[52] U.S. Cl. .................................. 222/442; 137/576; 222/425
[58] Field of Search ............... 222/425, 442, 450, 547, 222/564, 481; 137/571, 574, 576

[56] References Cited

U.S. PATENT DOCUMENTS

| | | | |
|---|---|---|---|
| 2,895,652 | 7/1959 | Rockriver | 222/442 |
| 2,912,143 | 11/1959 | Woolfolk . | |
| 2,935,236 | 5/1960 | Mueller | 137/576 X |
| 3,115,279 | 12/1963 | Christensen, Sr. et al. . | |
| 3,406,870 | 10/1968 | Arneson . | |
| 3,525,354 | 8/1970 | Parrish . | |
| 4,193,516 | 3/1980 | Purdy et al. | 222/547 X |

Primary Examiner—Robert J. Spar
Assistant Examiner—Edward M. Wacyra
Attorney, Agent, or Firm—Haven E. Simmons; James C. Nemmers

[57] ABSTRACT

A liquid dispenser having an outer tank and an inner tank or trap at the bottom thereof with an inlet from the outer tank features a proportioning device at the inner tank inlet which includes an inverted cup-like member with a floating check ball therein. The parts are arranged so that the check ball offers decreasing impedance to flow from the outer tank into the inner as the liquid level in the outer tank decreases, whereby to provide a substantially constant rate of flow into the inner tank regardless of the liquid level in the outer tank.

10 Claims, 4 Drawing Figures

DISPENSER FLOW PROPORTIONING DEVICE

BACKGROUND OF THE INVENTION

The present invention is shown and described in connection with a portable chocolate or like drink dispenser though its use is not limited to that type of dispenser alone. Drink dispensers usually employ some sort of timed metering device by which the amount of water, say, for the drink is measured out of a tank or reservoir. If a typical float system is employed to maintain a constant water level in the tank, there is always a constant head over the outlet from the tank to the metering device. But a float system requires a plumbing connection into a water supply system which more or less prevents the dispenser from being readily moved from place to place. It is for this reason that portable drink dispensers are popular and it is this type with which the present invention is concerned. In the portable dispensers no float system, of course, can be used and instead the water tank is manually filled from time to time as needed.

When no float system is used, however, so that the water level in the tank varies, it is necessary to provide some other means for supplying water at a predetermined constant rate to the metering device or otherwise the dispensed drinks will unacceptably vary in quantity and proportions as the water tank level falls. One approach uses an inner tank or "trap" at the bottom of the water tank which is vented to the atmosphere. Water from the tank is allowed to fill the trap through an inlet but once the metering device is activated, the inlet to the trap is closed so that water from the trap flows through the metering device at a predetermined rate. (The trap, of course, is always full of water before the metering device is activated.) If the inlet to the trap is not closed while the metering device is active, then water from the tank would continue to enter the trap at varying rates, depending upon the water level of the tank, and thus in turn vary the amount of water passing through the metering device and into the drink.

One typical manner of closing the inlet to the trap uses a solenoid operated valve which is closed when the metering device, usually a solenoid operated dump valve, is opened. Another way of accomplishing the same thing, a wholly mechanical system, is found in U.S. Pat. No. 2,912,143. An analogous technique is shown in U.S. Pat. No. 3,406,870 for dispensing a measured quantity of a chlorine liberating powder into a measured quantity of water. But the extra solenoid valve required in the first case is an expensive item and the various mechanical arrangements in the other cases are also expensive as well as complex. And all are subject to failure and thus costly to repair.

The primary object of the present invention, therefore, is to provide a simple, inexpensive proportioning device for a portable type drink dispenser which will assure a substantially constant amount of water or other liquid flowing from the trap or similar reservoir into the drink whenever the metering device is activated.

SUMMARY OF THE INVENTION

The invention attaches to the inlet of the trap a flow proportioning device in the form of a simple inverted cup-like member forming a vertical chamber substantially closed at the top but open at the bottom to the water tank. An outlet from the chamber intermediate its ends opens into the trap. Within the chamber is disposed a solid check ball of a specific gravity less than that of water or whatever other liquid is involved. The check ball is freely movable axially of the chamber and when the trap is full and the solenoid dump valve below the trap is closed, the check ball merely floats against the upper end of the chamber. But when the metering valve is opened with a full tank of liquid, the head of liquid in the tank and the consequent initial flow through the chamber into the trap causes the check ball to be pulled down and partially block the chamber outlet, thus reducing what would otherwise be a high rate of flow into the trap. As the water level in the tank and thus the head decreases while the dump valve is open, there is progressively less downward pull on the check ball and so progressively less blockage of the outlet into the trap. The movement of the check ball therefore compensates for what would otherwise be a progressively declining rate of flow into the trap as the water level descends with the net result that there is a more or less constant rate of flow and hence quantity of water entering the trap while the dump valve is open. This is true regardless of whether the water level in the tank is high or low when the dump valve is opened. The water entering the trap while the dump valve is open can therefore be readily accommodated for by the usual adjustment provided in the valve itself.

Other features and advantages of the invention will become apparent from the drawings and the more detailed description of the preferred embodiment which follows.

DETAILED DESCRIPTION OF THE PREFERRED EMBODIMENT

Figure 1:
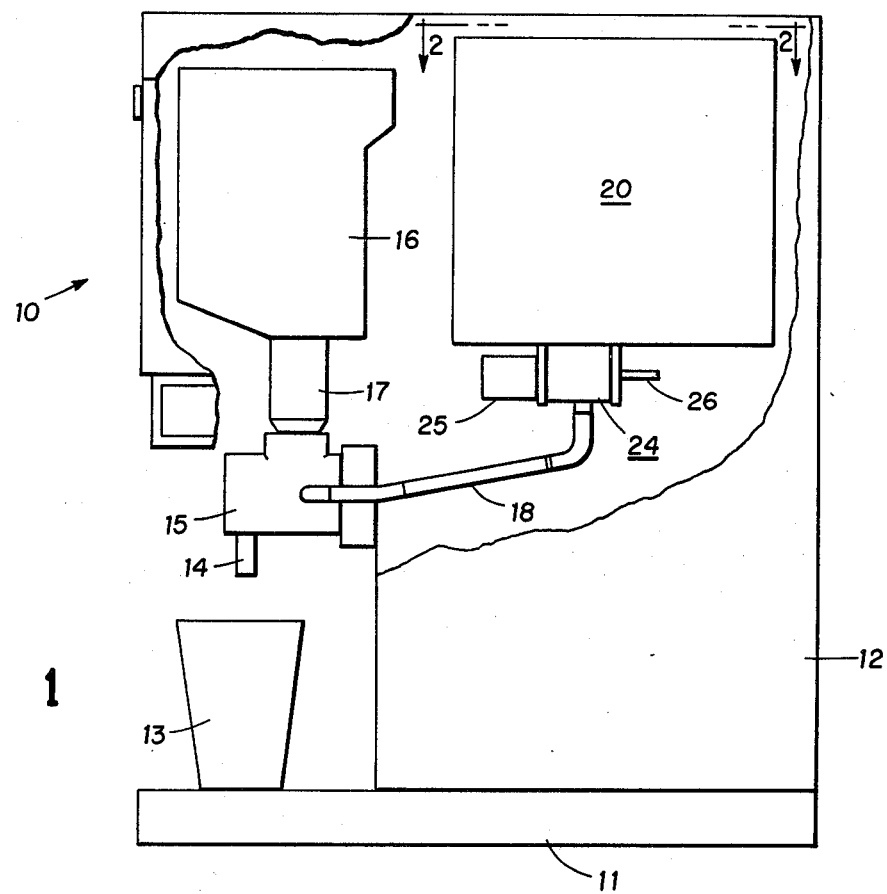
FIG. 1 is a simplified side elevational view of a portable chocolate drink dispenser incorporating the invention, a portion of the dispenser housing being broken away to illustrate some of the main components.

The portable drink dispenser 10, as shown in FIG. 1, consists essentially of a base 11 and housing 12 with an inset for a glass or cup 13. The latter is filled by an outlet 14 from a typical mixing chamber 15 (usually including a powered stirrer) into which chocolate or other flavor or concentrate is introduced from a bowl 16 through a measuring device 17. At the same time a measured amount of water or other liquid is introduced into the mixing chamber 15 through tubing 18 from beneath the main liquid or water supply reservoir or tank 20. To this extent the dispenser 10 is quite conventional and well known in the art, so its other components, including various electrical items, timers, controls, circuitry, etc. need not be further described for purposes of the invention.

Figure 2:
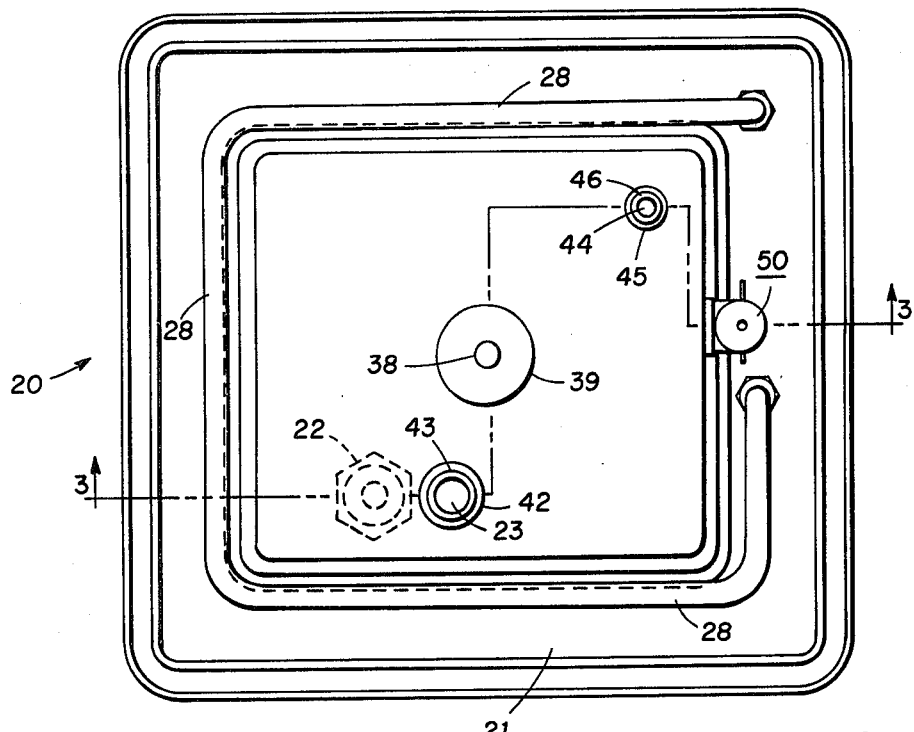
FIG. 2 is a top plan view of the dispenser's water tank taken from the line 2—2 of FIG. 1.
Figure 3:
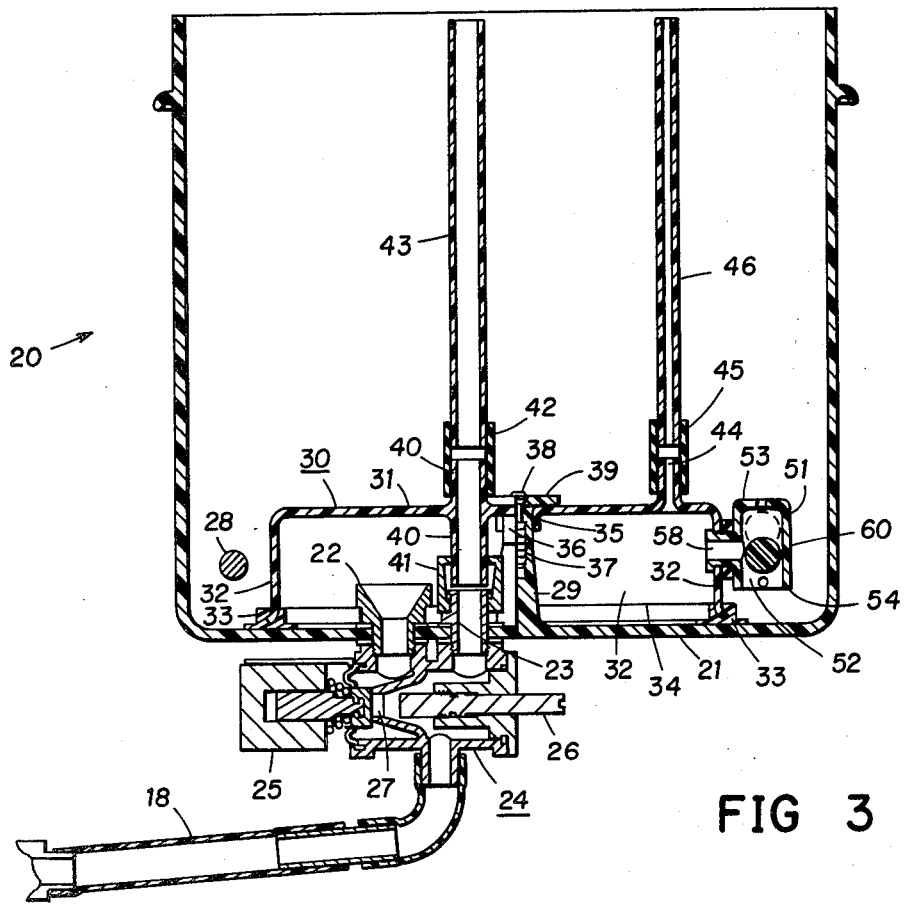
FIG. 3 is a sectioned elevational view of the water tank taken along the line 3—3 of FIG. 2.

The generally rectangular supply tank 20 is preferably molded from a suitable plastic, such as polysulfone, and is open at its top to the atmosphere within the dispenser housing 12. The tank bottom wall 21 is flat and, as shown in FIGS. 2 and 3, is apertured at two locations. In one of the latter is disposed a vortexed liquid outlet fitting 22 and an air vent fitting 23. The lower ends of the fittings 22 and 23 are threaded into and support a typical dump valve 24 which empties into the tubing 18, suitable gaskets being employed between the fittings 22, 23 and the bottom wall 21 and between the latter and the valve 24. The dump valve 24 is operated by a solenoid 25 and the amount of liquid passing through the valve 24 is adjusted by a threaded stem 26 just downstream of the orifice 27. The valve 24 is vented in order to prevent possible internal air locks. In order to heat the liquid in the tank 20 a suitable heating element 28 is disposed about and just above the tank bottom wall 21, the latter also including a centrally located, upstanding integral boss 29 (see FIG. 3).

The inner reservoir or "trap" 30 is also molded of a suitable plastic, preferably polysulfone also, in the shape of a generally rectangular shallow pan. The latter is inverted on the tank bottom wall 21 to form the top wall 31 and side walls 32 of the trap 30. The lower edges of the side walls 32 are somewhat flanged at 33 and are socketed in a rectangular gasket 34 on the tank bottom wall 21, whereby the latter wall also forms the trap bottom wall. The trap top wall 31 is molded with a downwardly coined aperture 35 aligned with the tank boss 29 which receives a molded plug 36 anchored atop the boss 29 by a stainless steel threaded stake 37 secured in the plug 36 and into an axial hole in the boss 29. The upper end of the plug 36 is formed with an integral head 38 of lesser diameter having an angled annular underface relative to the trap top wall 31. The trap 20 is pressed down upon the gasket 34 and an annular gasket 39 is pushed down over the head 39 and retained between the underface of the latter and the trap top wall 31, as shown in FIGS. 2 and 3, whereby the trap is maintained sealed against the tank bottom wall 21 and about the plug head 38. The trap top wall 31 is also provided with integral nipples 40 above and below the top wall 31 in alignment with the dump valve vent fitting 23, the lower nipple 40 being slipped in the upper end of an elastomeric annular seal 41 seating at its lower end over the vent fitting 23. The upper nipple 40 is joined by an elastomeric sleeve 42 to the lower end of a vent tube 43 in order to vent the dump valve 24 to the atmosphere at the top of the tank 20. An upward nipple 44 is molded into the trap top wall 31 adjacent a corner and is joined by an elastomeric sleeve 45 to the lower end of a vent tube 46 in order to vent the interior of the trap 30 to the atmosphere above the tank 20.

The proportioning device or "proportioner" of the invention, generally indicated at 50 (see FIG. 4), consists of an inverted cup-like housing 51, preferably molded from the same material as the trap 30, having an inner cylindrical bore forming a chamber 52 walled at 53 at one end and open at the other end 54. Approximately midway between the chamber ends 53 and 54 a rectangular boss 55, integral with the exterior of the housing 51, is formed at its outer end with a cylindrical neck 56 terminating in a pair of opposite, radially extending lugs 57 parallel to the axis of the chamber 52. The boss 55 includes an inner cylindrical bore into the chamber 52 in order to provide a chamber outlet 58, the axes of the chamber 52 and outlet 58 intersecting each other at right angles. In the chamber 52 is disposed a loosely fitting spherical member or check ball 60, freely movable between the chamber ends 53 and 54 past the outlet 58 and retained by a pull pin 61. The axial length of the chamber 52 is sufficient so that when the check ball 60 is adjacent the end wall 53 there is relatively little obstruction to flow of liquid into the chamber outlet 58. The check ball 60 itself, if solid as is preferable for the particular installation concerned, is molded from a suitable plastic, such as polypropylene, having a specific gravity less than that of the liquid employed in the tank 20. A specific gravity of about 0.90 to 0.94 has been found suitable where the liquid is water. Should the check ball 60, however, be hollow, which is preferred when liquids of lesser viscosity are involved, then its weight must be less than that of an equal volume of the liquid concerned, which in effect, is also true of course if the check ball 60 is solid.

Figure 4:
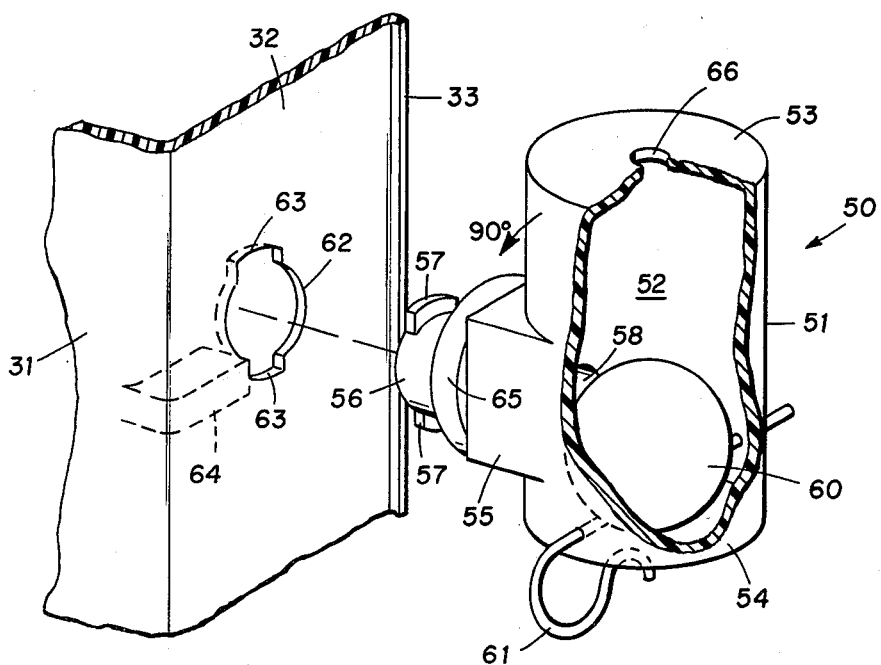
FIG. 4 is an enlarged perspective view of the flow proportioning device of the invention incorporated in the dispenser of FIG. 1.

The proportioner 50 is mounted on a side wall 32 of the trap 30 through an aperture 62 therein for this purpose (see FIG. 4) which is appropriately horizontally relieved at 63 to accommodate the lugs 57. The housing 51 is then rotated 90°, as shown in FIG. 4, so that the chamber end wall 53 is uppermost and the lugs 57 engaged against the inner surface of the side wall 32, an integral stop 64 being provided for that purpose on the side wall 32 and a suitable gasket 65 interposed between the latter wall and the boss 55. The axis of the chamber 52 is thus vertically disposed with respect to the liquid level in the tank 20. When there is an appreciable quantity of liquid in the tank 20, the liquid thereby in the chamber 52 causes the check ball 60 to float and remain in the upper reaches of the chamber 52, as indicated in broken lines in FIG. 3, any air in the trap 30 escaping through the vent tube 46. In order to allow air or sediment trapped in the chamber 52 to escape, the end wall 53 may be provided with a small port 66.

When the dump valve 24 is opened for a timed interval and liquid begins to drain from the trap 30 through the outlet fitting 22, liquid from the tank 20 enters the chamber 52 through its open end 54 and thence through the chamber outlet 58 into the trap 30. The rush of liquid past the check ball 60 causes the latter to be dragged part way down the chamber 52 and partially block or impede the flow into the outlet 58. The amount of such impedance depends upon the height or head of the liquid in the tank 20. As previously noted, the greater the head the greater the impedance and vice versa. The result is that during the interval the dump valve 24 is open and the head in the tank 20 lowers, the check ball 60 gradually rises in the chamber 52, owing to the decreasing rush of liquid past it, whereby a relatively constant rate of liquid flow into the trap 30 is achieved. Hence the quantity of liquid entering the trap 30 during the same interval is also relatively constant and can be compensated for by adjustment of the dump valve stem 26. The foregoing is true whether the initial liquid level in the tank 20 is high or low when the dump valve 24 is opened. When the dump valve 24 closes, the flow into the trap 30 decreases still further, allowing the check ball 60 to float back into the upper reaches of the chamber 52 so as not to prevent refilling of the trap 30.

It has been found in practice that for best results the diameter of the chamber outlet 58 should be approximately one-half the diameter of the check ball 60. For a given size of the latter a larger outlet 58 tends to provide too much impedance, the check ball 60 sometimes sticking in the inner end of the outlet 58, while a smaller diameter of the latter tends to provide insufficient impedance. In a working example of the invention, for instance, in conjunction with a tank 20 of 8 inch depth and a trap 30 of 1½ inch height, the chamber 52 may be approximately one inch in length and 9/16 inches in diameter, the chamber outlet 58 being ¼ inch in diameter and located midway between the chamber ends 53 and 54, while the diameter of the check ball 60 is accordingly ½ inch. In some cases, if the lowermost usable level in the tank 20 is sufficiently close to the level of the chamber 52, it may be necessary to decrease the height of the chamber 52 above the outlet 58 in order for the flow through the chamber properly to activate the check ball 60. This can be accomplished by sizing the chamber 52 or the location of its outlet 58 to accommodate a particular installation. Finally, as will be apparent, the trap 30 is easily removed for cleaning simply by prying off the gasket 39 from the plug head 38 and then lifting the entire assembly bodily from the tank 20. The proportioner 50 can be removed for the same purpose either independently of the trap 30 or after the latter's removal simply by rotating it in the opposite direction to that indicated in FIG. 4, whereupon the check ball 60 will drop free of the chamber 52 upon withdrawal of the pull pin 61.

As previously noted, though the invention is shown and described in the context of a portable drink dispenser, it is equally adaptable to dispensers of other liquids in other contexts, and affords a simple and inexpensive means of accomplishing what heretofore has required more elaborate apparatus. In fact, it can often advantageously be used even in dispensers which incorporate a float or liquid level sensing system. This is because such systems may have a fairly wide "on-off" differential for liquid inlet so that the liquid level in the supply tank accordingly varies enough to significantly affect the metering of the liquid by the dump valve or the like. In those cases, use of the proportioner of the invention in conjunction with a trap will better control that liquid metering. Hence though the invention has been described in terms of a particular embodiment, being the best mode known of carrying out the invention, it is not limited to that embodiment alone. Instead, the following claims are to be read as encompassing all adaptations and modifications of the invention falling within its spirit and scope.

I claim:

1. In liquid dispensing apparatus including a first container for liquid and a second container for liquid disposable below a liquid level in the first container, the second container having an inlet for liquid from the first container and an outlet for liquid, valve means to open and close said outlet, and means for venting the second container above said liquid level, the improvement comprising: flow control means for the second container inlet for controlling the flow of liquid from the first container into the second container so that the quantity of said flow when said valve means is open during a selected time period is substantially independent of said liquid level in the first container, the flow control means including a flow control housing disposable below said liquid level, the housing having a chamber for liquid therein and upper and lower ends with respect to said liquid level, the lower chamber end communicating with the first container for flow of liquid therefrom into the chamber, the chamber having an outlet for liquid therefrom intermediate said chamber ends in communication with the second chamber inlet for flow of liquid from the chamber into the second container; and a liquid flow check member retainable and movable in the chamber between said ends towards and away from said chamber outlet, the check member having a weight less than that of an equal volume of liquid for the first container, the check member, the chamber and the chamber outlet being proportioned relative to each other so that when said valve means is opened the check member moves relative to the chamber outlet effective to provide decreasing impedance to liquid flow from the chamber through the chamber outlet during said time period.

2. Apparatus according to claim 1 in which the second container is disposed within the first container.

3. Apparatus according to claim 2 in which the first container comprises an upwardly opening tank having a bottom wall and the second container comprises a reservoir disposed on the tank bottom wall, the tank bottom wall also forming a common bottom wall with the reservoir, and in which the second container outlet passes through said common bottom wall, said valve means being disposed adjacent said outlet and exteriorly of the tank.

4. Apparatus according to claim 1, 2 or 3 in which the flow control housing comprises an inverted cup member and the liquid chamber comprises a cylindrical bore in the cup member extending transversely of said liquid level, said bore being defined by a cylindrical wall and by an end wall constituting said chamber upper end, the other end of said bore being open and constituting said chamber lower end, said chamber outlet being defined by a cylindrical bore through said cylindrical wall, the axes of said bores intersecting each other at right angles; and in which the check member comprises a solid spherical member loosely fitting in said chamber bore and movable along the axis thereof.

5. Apparatus according to claim 4 in which the diameter of said outlet bore is approximately one-half the diameter of said spherical member.

6. Apparatus according to claim 5 in which said upper end wall is provided with an aperture therethrough of a diameter less than that of said spherical member; and including removable means disposed adjacent the chamber bore lower end for retaining said spherical member therein in the absence of liquid in the chamber bore.

7. A liquid flow proportioning device for use with liquid dispensing apparatus having an outer liquid container and an inner liquid container disposed in a lower portion of the outer container with the inner container including a liquid inlet from the outer container and a liquid outlet, the proportioning device being disposable in the outer container upstream of the inner container inlet and comprising: a molded member having a cylindrical chamber therein with an inlet at one end and an end wall at the other end, the molded member having a cylindrical chamber outlet opening at one end into said chamber intermediate said ends thereof, the other end of the chamber outlet being adapted to engage the inlet of said inner container and a check ball member having a weight less than that of the volume of a liquid displaced by said member, the check ball member being disposed in the chamber and freely movable along the axis thereof to positions allowing liquid flow from the chamber to the chamber outlet, the diameter of said member being approximately twice the diameter of the chamber outlet.

8. The device according to claim 7 in which the axes of the chamber and the chamber outlet intersect each other at right angles, and in which the chamber end wall includes an aperture therethrough of lesser diameter than that of the check ball member.

9. The device according to claim 8 in which the chamber opens through said inlet end thereof and including means adjacent said chamber inlet end releasably maintaining the check ball member in the chamber.

10. The device of claim 7, 8 or 9 with the inner container having a top wall and a side wall, the top wall including means for venting the inner container to the atmosphere and the side wall including a liquid inlet mounting said proportioning device with said chamber end wall uppermost.

* * * * *